United States Patent [19]
Bell

[11] Patent Number: 5,542,366
[45] Date of Patent: Aug. 6, 1996

[54] AIR CUSHION VEHICLE WITH HIGH STABILITY SKIRT SYSTEM

[75] Inventor: James C. Bell, New Orleans, La.

[73] Assignee: Textron Inc., Providence, R.I.

[21] Appl. No.: 418,494

[22] Filed: Apr. 7, 1995

[51] Int. Cl.$^6$ ................................ B63B 1/34; B60V 1/16
[52] U.S. Cl. ........................................ 114/67 A; 180/127
[58] Field of Search ................ 114/67 A; 180/116–129; 244/100 A

[56] References Cited

U.S. PATENT DOCUMENTS

| | | | |
|---|---|---|---|
| 3,850,126 | 11/1974 | Leonard | 114/67 A |
| 4,279,322 | 7/1981 | Wheeler et al. | 180/128 |
| 4,834,011 | 5/1989 | Bell | 114/67 A |

Primary Examiner—Jesus D. Sotelo
Attorney, Agent, or Firm—Perman & Green

[57] ABSTRACT

An air cushion vehicle having a low drag, high stability non-scooping skirt system including closed loop finger sleeves. An enlarged bag combines to provide a more responsive skirt profile. The sleeves of this invention are trimmed at an angle to the supporting surface, thereby exposing the sleeve opening to the air cushion. The sleeve is maintained at the air cushion pressure unless the vehicle rolls enough to submerge and close the sleeve opening. A pressure build up occurs as the opening is submerged and a significantly greater differential pressure is obtained with an enhanced restoring moment. The interior wall of the sleeve that faces the air cushion is angled slightly inward on the bow and side seals to allow momentary collapse of the sleeve and release of an extraordinary force of a rough sea. In addition the effective air cushion area, the platform of the vehicle, is extended to its maximum to provide greater stability.

7 Claims, 4 Drawing Sheets

AIR CUSHION VEHICLE WITH HIGH STABILITY SKIRT SYSTEM

BACKGROUND OF THE INVENTION

The present invention relates to an improved skirt system for an air cushion vehicle. Such vehicles are supported by a pressurized air cushion contained within a depending skirt installed about the bottom periphery of the vehicle's hull. The skirt consists of a peripheral bag fixed to the hull and a bow seal, a stern seal, and side seals extending downward from the bag. The bag is generally inflated by pressurized air from the air cushion supply. Once inflated it acts as a fluid distribution medium and a resilient support for the vehicle to absorb and distribute shock. The seal assembly defines the air cushion containment structure and as such must be delicately balanced to provide pitch and roll stability, low drag, structural integrity, and restoring moment in addition to its basic role of air cushion containment.

Among the problems encountered with known skirt designs are (a) the tendency of the inflated seal at the bow of the vehicle to tuck under, deflate against the hull and cause the craft to plow in or pitch forward upon encountering rough seas; (b) the necessity for longitudinal and transverse stability seals and their associated ducting, air flow and maintenance requirements; (c) pitch and roll stability; (d) excessive drag; (e) payload restrictions depending upon speed and sea conditions; (f) cushion air leakage through the skirt elements; (g) skirt and seal damage on contact with obstacles; and (h) the quality of the ride over waves and rough surfaces.

In the most common configuration currently in use the seal elements are open loop shaped fingers depending downward from the bag and being open at its interior to the air cushion, as shown in U.S. Pat. No. 4,279,322 at FIG. 5. To enhance the stability of this design, longitudinal and are used as shown in U.S. Pat. No. 3,850,126. These seals increase the complexity of the system and create severe maintenance problems. It is one purpose of this invention to eliminate the need for longitudinal and transverse stability seals.

In another early competitive skirt design, the seal was constructed as a continuous assembly of contiguous downward tapered, conically shaped sleeves depending from the bag about the lower periphery of the vehicle. The sleeves define individual cells open at the bottom and communicating with the interior of the bag at the top to receive pressurized fluid therefrom. To provide rigidity to the otherwise flexible sleeve, each sleeve is pressurized by bleed air from the peripheral bag. As such seals dip into the water with the pitch or roll motion of the vehicle, there is a pressure increase in the sleeve cell which generates a restoring moment at that position to stabilize the vehicle. In some instances, the sleeve of the prior art is maintained at a pressure which is greater than the air cushion pressure and opens in a plane generally parallel to the terrain being traversed.

A differential restoring pressure occurs because of the movement of the water surface upward against the sleeve, thereby compressing the pressurizing fluid and extending the force over an increasing area because of the conical shape of the sleeve.

A serious problem occurs with the bow and side seals of the prior art when the vehicle encounters waves or when the vehicle pitches or rolls in the general direction in which the vehicle is travelling. This motion causes the sea to catch the seal with substantial force which may tear the seal and bag from the hull, thereby causing a complete failure of the seal structure. This immediately creates a breach to air cushion containment and a resultant serious instability condition. This generally occurs in surf or rough seas when stability of the vehicle is of prime concern.

Bow and side seals of the prior art are shown in FIGS. 1 and 2 respectively. In these systems the generally conically shaped sleeves have openings that are parallel to the plane of the terrain. This combined with an outward slant to the air cushion side face of the sleeve results in a scooping effect on rough water severely stressing the seal structure.

The seal system at the stern of the vehicle differ from the seals at the bow and sides of the vehicle since the stern sleeves, although open at the bottom, must be closed on the inboard side in the direction of the air cushion in order to provide a smooth planing surface which permits the vehicle to move freely over terrain without snagging or scooping. A conical stern seal design is shown in U.S. Pat. No. 4,834,011. Therefore, while such stern seals become pressurized, they only permit the escape of pressurizing air when they are lifted off the surface of the water. A stern seal of the prior art is shown in FIG. 3.

It is the purpose of this invention to provide a unique seal system which provides enhanced stability of the vehicle particularly in rough seas during which it is most important. The seal system of this invention is designed to avoid catastrophic breaching of the seal system by maintaining the structural integrity of the seal system under all conditions. In addition an improved and more responsive restoring moment is provided at all times to more efficiently compensate for pitch and roll motions. All these features are established with a decrease in overall drag.

SUMMARY OF THE INVENTION

The present invention relates to an improved seal system for air cushion vehicles which comprises a series of pressurizable sleeve elements tapered downward and open inward into the air cushion at the supporting surface, to produce a peripheral stabilization pressure at the bow and sides of the vehicle when it pitches or rolls. This pressure provides an additional restoring moment to counteract the pitch and roll motions, improving ride performance in rough sea conditions, and alleviating the need for longitudinal and/or transverse stability seals or barriers.

In normal operation the sleeves of this invention are at air cushion pressure, but when the vehicle pitches or rolls, the sleeve elements are closed by engagement with the water. A differential pressure accumulates causing an upward force to compensate for the pitch or roll, thus providing a restoring moment to stabilize the vehicle more quickly than is otherwise possible.

The sleeves of this invention are trimmed at an angle to the supporting surface, thereby exposing the sleeve opening to the air cushion. The sleeve is maintained at the air cushion pressure unless the vehicle rolls enough to submerge and close the sleeve opening. A pressure build up occurs as the opening is submerged and a significantly greater differential pressure is obtained with an enhanced restoring moment. Thus the pitch or roll motion is cushioned as the vertical sleeve elements on the down side of the vehicle engage the water surface and become sealed, pressurized and compressed to provide restoring moment to counteract the pitch or roll, while on the opposite side of the craft, the reverse pitch or roll motion is mitigated as the vertical sleeve elements at that side disengage from the water surface, break the seal and lose pressure to further counteract the pitch and roll moment and stabilize the vehicle.

The interior wall of the sleeve that faces the air cushion is angled slightly inward on the bow and side seals to minimize drag and allow momentary collapse of the sleeve and release of an extraordinary force of a rough sea. The stern seal is constructed with a rear wall angled outward from the vehicle to extend the planing surface that it provides. In addition the effective air cushion area, the planform of the vehicle, is extended to its maximum to provide greater stability by moving the seals to the maximum outward position.

DESCRIPTION OF THE DRAWINGS

The preferred embodiment of the invention is described below with reference to the attached drawing in which.

DESCRIPTION OF THE PREFERRED EMBODIMENT

Figure 1:
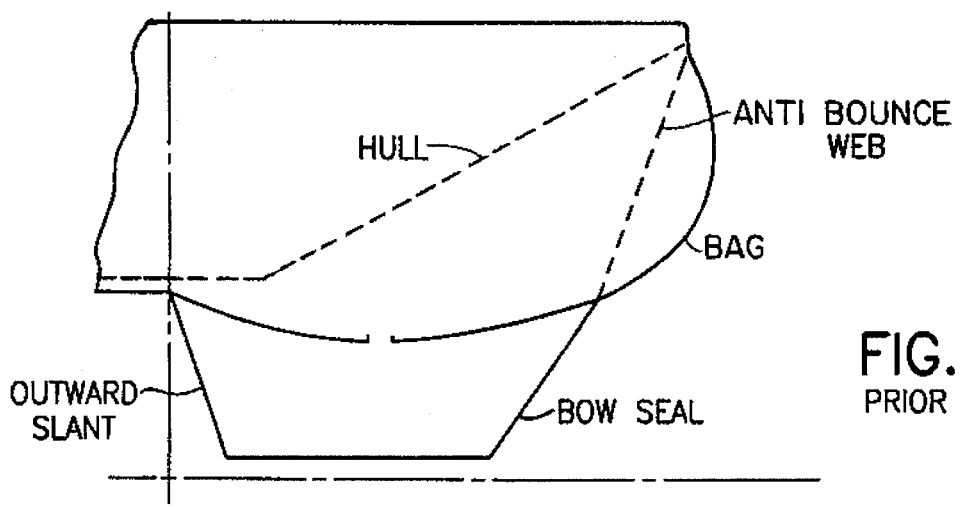
FIG. 1 is a side view of a bow seal of the prior art.
Figure 2:
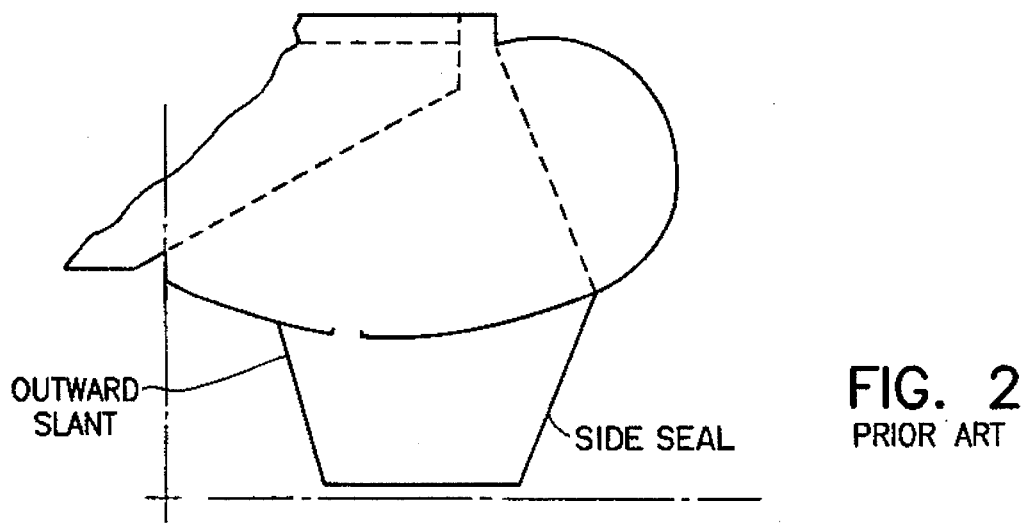
FIG. 2 is a side view of a side seal of the prior art.
Figure 3:
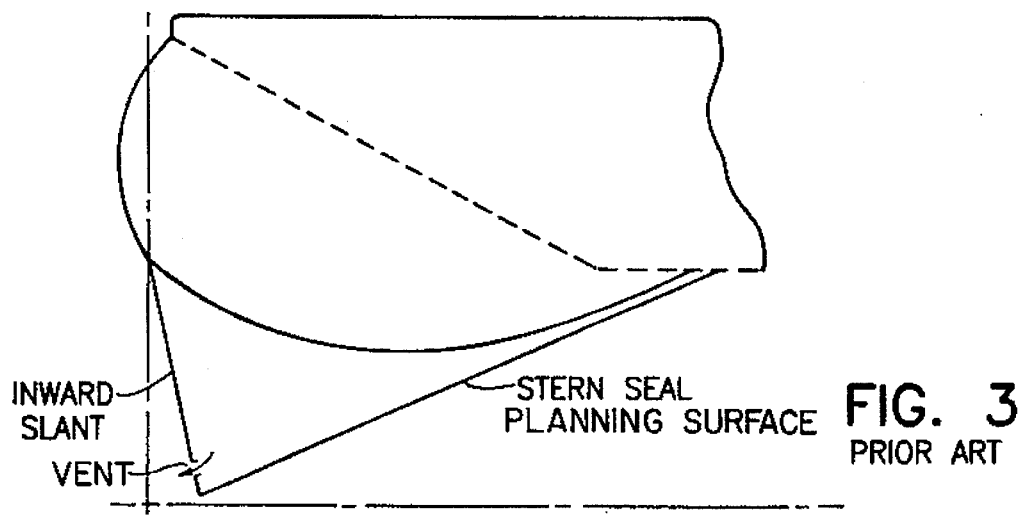
FIG. 3 is a side view of a stern seal of the prior art.
Figure 4:
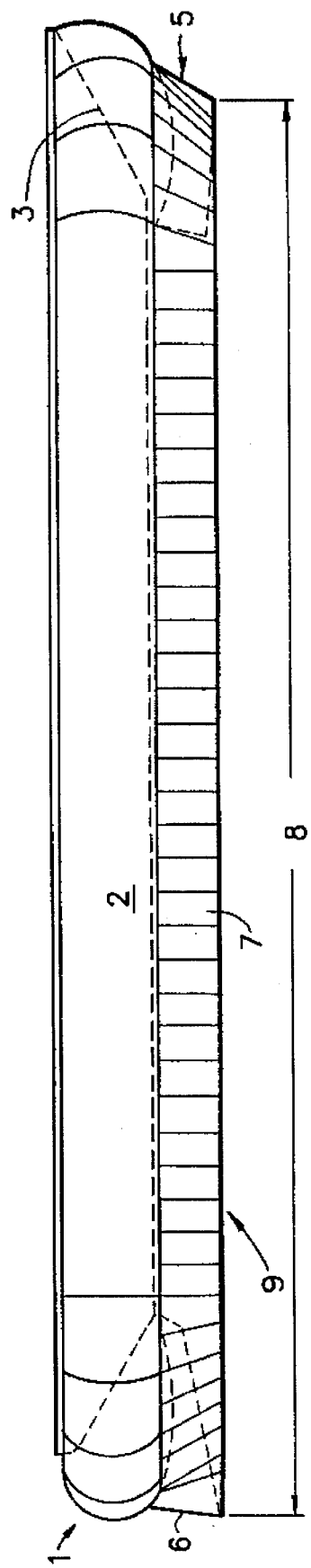
FIG. 4 is a side view of an amphibious air cushion vehicle employing the seal system of the subject invention.

The invention consists of a skirt system 1, as shown in FIG. 4, consisting of a flexible bag 2 fixed to the periphery of the hull 3 of an air cushion amphibious vehicle. A seal assembly 9 is comprised of a set of bow seals 5, stern seals 6, and a pair of opposing side seals 7 each having a specific shape and position to maximize the performance of the vehicle.

The bag 2 is generally of conventional construction and performs to distribute air to the seal system and to act as a resilient support for the vehicle. The bag 2 of the system of this invention is enlarged to provide structural support to the seals described below which are placed as far outward as possible to expand the planform of the vehicle. Depending from the bag 2 is the seal assembly 9 attached to the bag 2 in a conventional manner. The individual components of the seal system 9 are best shown in FIG. 5 through FIG. 8. In the description below the seal structure of this invention is described with directions relative to the vehicle for example: outward means generally in the direction of the exterior of the vehicle.

Figure 5:
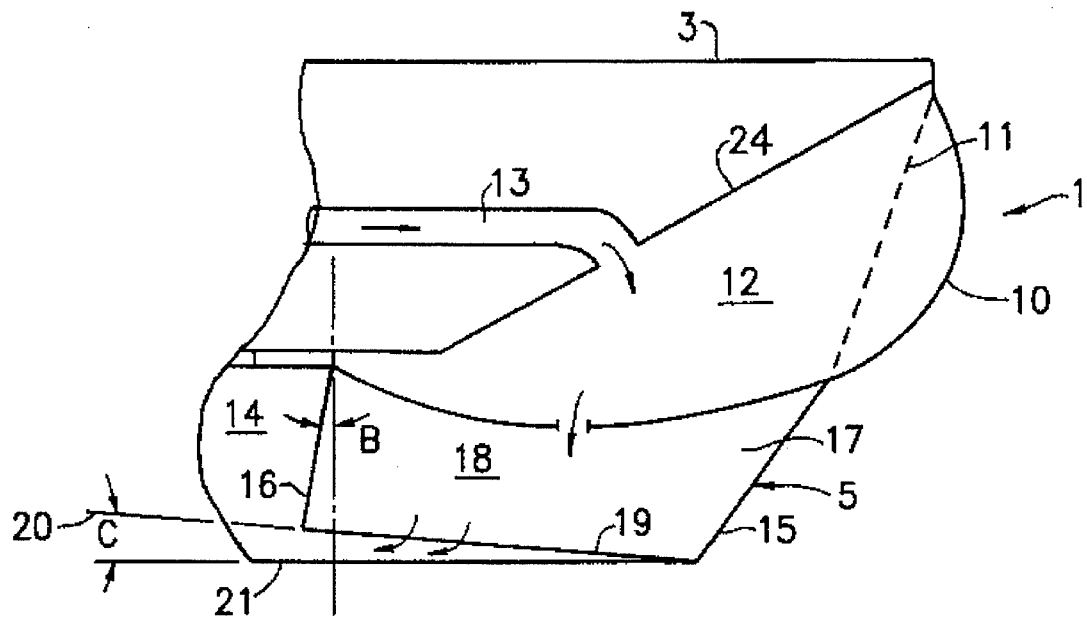
FIG. 5 is a side view of the bow bag and seal sleeve in accordance with the subject invention.

The bow segment of skirt 1 is shown in side view in FIG. 5 and consists of a bow bag 10 supported by anti-bounce web 11 fixed to the bow 4 of the hull 3 and a bow seal 5 fixed to the bow bag 10. Bow bag 10 encloses a plenum 12 which extends through all sections of the bag 2 and is inflated by pressurized air 13 from the supply to air cushion 14.

Figure 7:
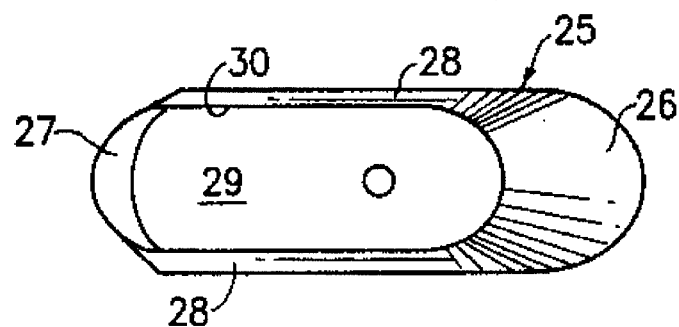
FIG. 7 is a bottom view of the side seal sleeve in accordance with the subject invention.

Bow seal 5 is formed as a sleeve with outer wall 15 and inner wall 16 each having a generally curved cross section similar to side seal 25 as shown in FIG. 7. The walls 15 and 16 are connected by side walls 17 to complete the sleeve and enclose the seal cell 18. Cell 18 is formed with a continuously reduced cross section from the bag 2 downward and has an opening 19 at its lower extremity. Opening 19 is formed in a plane 20 trimmed inward at an angle C to the terrain or sea 21. Angle C, at a minimum, needs to be sufficient to open the full extent of the cell opening 19 to the air cushion 14. Angle C is selected to allow a degree of pitch and roll before the restoring moment is initiated. Angle C also may vary at different sections of the seal.

Aft side fingers, i.e., to the rear of the center of gravity, as an example, are trimmed with a larger angle C because although lower trim angles on aft side fingers augment roll restoring moment, they also reduce pitch moment. The reason for this is that when the craft pitches down it essentially rotates about the stern seal fingers. Although dynamic forces tend to act about the craft center of gravity (C.G.), the stern does not lift off the surface because it would have to vent the cushion to do so. Therefore, if all the side fingers are trimmed at the same height, when the craft pitches down, the side fingers forward of the C.G. provide a positive pitch restoring moment about the craft C.G. and the side fingers aft of the C.G. provide a pitchdown or negative moment about the craft C.G. In this manner, the negative moment tends to negate the positive pitch restoring moment of the forward side fingers. To preclude this phenomena, the side fingers aft of the craft longitudinal center of gravity (LCG) are trimmed higher so that they do not react to provide lift forces as soon as the forward side fingers. However, although they also don't react as fast as the forward side fingers in roll, they are still effective for resisting the larger roll angles.

Cell 18 communicates with the bag plenum 12 to receive pressurized air 13. Pressurized air 13 maintains the seal 5 extended and provides structure to the sleeve. Pressurized air 13 in normal operation will be released into the air cushion 14 through opening 19 as shown. Wall 16 of the bow seal 5 is slanted inward at an angle B to the vertical of from 5 to 15 degrees from top to bottom to avoid catching a wave and to allow bending in response to extraordinary forces in rough seas. Walls 15 and 16 cooperate to insure they reduce cross section of cell 18.

Figure 6:
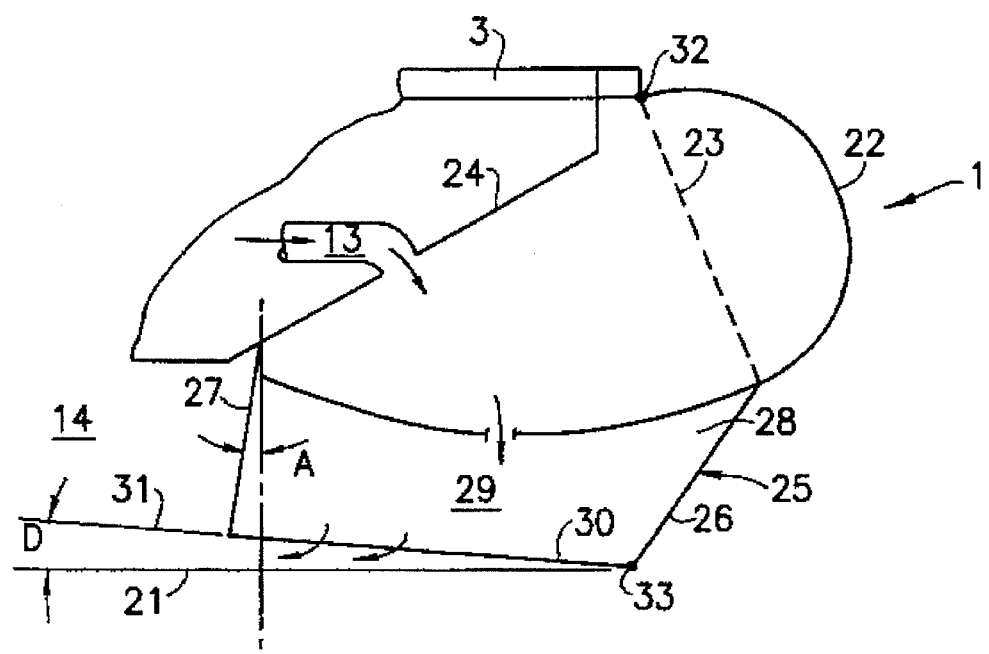
FIG. 6 is a side view of the side bag and seal sleeve in accordance with the subject invention.

The side segment of skirt 1 is shown in side view in FIG. 6 and, similar to the bow segment, consists of a side bag 22 supported by anti-bounce web 23 fixed to the side 24 of the hull 3 and a side seal 25 fixed to side bag 22. Side bag 22 encloses the side section of plenum 12.

Similarly to bow seal 5, side seal 25 is formed as a sleeve with outer wall 26 and inner wall 27 each having a generally curved cross section as shown in FIG. 7. The walls 26 and 27 are connected by side walls 28 to complete the sleeve and enclose seal cell 29. As in cell 18, cell 29 is also formed with a continuously reduced cross section from the side bag 22 downward and has an opening 30 at its lower extremity. Opening 30 is formed in a plane 31 trimmed inward at an angle D to the terrain or water surface 21. Angle D, at a minimum, needs to be sufficient to open the full extent of the cell opening 30 to the air cushion 14. Cell 29 communicates with the bag plenum 12 to receive pressurized air 13.

Air 13 maintains the seal 25 extended and provides rigid structure to the sleeve. Air 13 in normal operation will be released into the air cushion 14 through opening 30 as shown. Inner Wall 27 of the side seal 25 is slanted inward at an angle A to the vertical to avoid catching a wave and to allow bending in response to extraordinary forces in rough seas. Walls 26 and 27 cooperate to form the reduced cross section from top to bottom of cell 29. Angle A should be in the range of 0 to 15 degrees.

Side section 22 of bag 2 should be large enough to allow side seal 25 to be positioned outward on the side bag 22 to its maximum distance as determined by the resilient characteristics of the bag 2. Generally an alignment of the hull extremity 32 with the planform boundary 33 will maximize the planform 8 without increased risk of collapsing bag 2 in normal operation.

Figure 8:
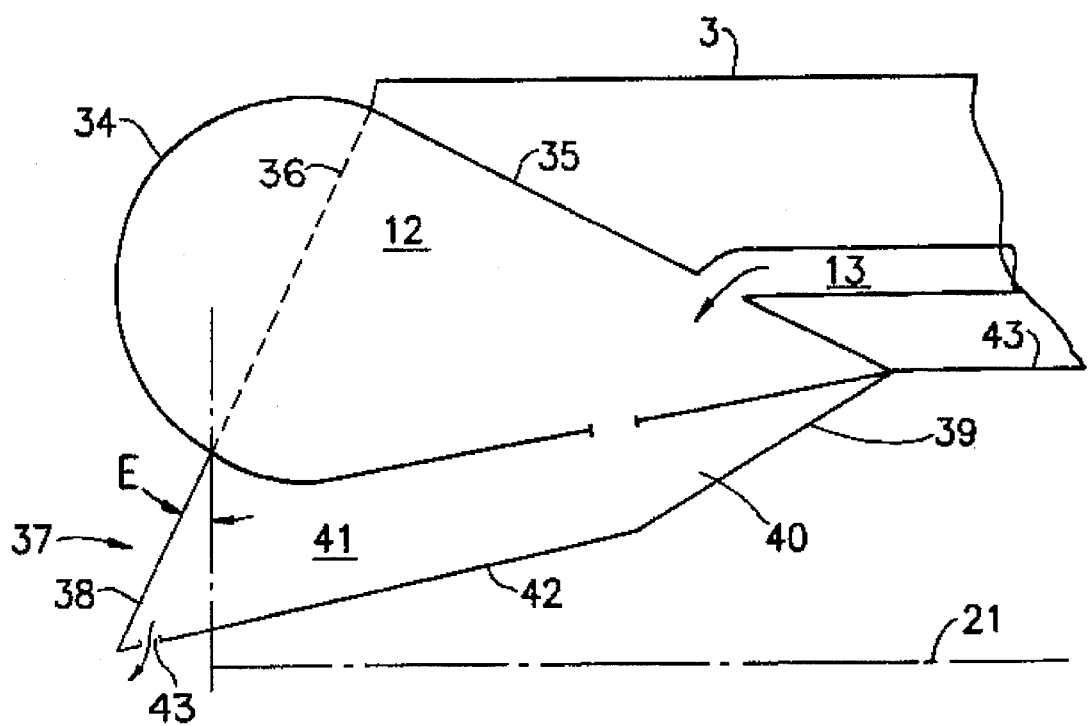
FIG. 8 is a side view of the stern bag and seal sleeve in accordance with the subject invention.

The stern portion of skirt 1 consists of a stern bag 34 fixed in a known manner to the stern 35 of hull 3 and having an anti-bounce web 36. Stern seal 37, illustrated by FIG. 8, is similar in construction to the bow and side seals and is accordingly constructed of a series of sleeves having outer walls 38 and inner walls 39 connected by side walls 40 to enclose a cell 41 of a continuously reduced cross section from the stern bag 34 downward. The cell 41 is distinguished from the other seal segments in that it is substantially closed by a bottom wall which forms planning surface 42. Pressurized air 13 again provides structural inflation to the sleeve but is exhausted from cell 41 through a limited opening 43 at the rear of the planning surface 42.

The planning surface is extended forward to connect, via inner wall 39, to the inner bag attachment at the air cushion deck 43 of hull 3 thereby elongating the surface area of the planning surface. Depending on the geometry, the planing surface 42 can have a single planing slope or it can have a dual slope in cooperation with inner wall 39. The dual slope may be necessary to maintain inflation stability. The outer wall 38 is slanted outward at an angle E to the vertical. The planing surface 42 in cooperation with the outward slanted wall 38 provides a more shallow angle to the sea, which creates a softer, more responsive stern seal that will plane more smoothly with less drag over waves and obstacles.

The Operation

During normal operation, the seal elements 5, 25, and 37 generally ride over the water in the manner illustrated. Extending downward and inward to the supporting surface such as the water's surface, they form a peripheral barrier to contain the air cushion and define a planform significantly larger than the seal systems of the prior art. The inner walls of bow seal 5 and side seals 25 ride at a slight distance above the surface of the water thereby exposing the seal sleeve cells to the air cushion and maintaining the pressure within the seals substantially at air cushion pressure. Whenever the bow pitches or the sides roll downward, the openings of the sleeve cells become closed by immersion in the sea and the sleeves develop a pressure which rapidly rises to about 3 to 5 times greater than the air cushion pressure beneath the hull 3. This increased pressure counteracts the downward pitch and roll and provides an upward moment to stabilize the vehicle.

Through the rapid development of a differential pressure, even with relatively small pitch and roll angles, the skirt system of this invention will maintain stability and quickly provide restoring moment to neutralize small pitch and roll movements of the vehicle before they can escalate, thus greatly enhancing the ride of the vehicle in any sea condition. Bag 2 is enlarged to allow the positioning at the seal system 9 to the furtherest outward extent possible thereby increasing the planform of the vehicles and enhancing stability.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. In an amphibious vehicle having a hull consisting of a bow, a stern, and sides and being supported above a surface by an air cushion, a skirt system for supporting and containing the air cushion comprising:

a flexible bag, inflated by a pressurized fluid, surrounding the periphery of the bottom of the hull and extending downward therefrom;

a seal system depending downward from the inflated bag, said seal system comprising a bow seal, a stern seal and a pair of side seals, wherein the bow seal comprises a series of flexible sleeves fixed to and depending downward from the inflated bag at the bow of the hull, each of said sleeves having a rearward facing wall, a forward facing wall, and side walls, said walls cooperating to form an interior cell communicating with the flexible bag to receive pressurized fluid therefrom to cause said sleeve to inflate, said cell having an opening at its lower end, said opening being in a plane extending at an upward inclined angle from the plane of the supporting surface toward the air cushion thereby exposing said opening to the air cushion, the rearward facing wall of said sleeve facing the air cushion being slanted rearward from top to bottom at an angle to the vertical.

2. In an amphibious vehicle having a hull consisting of a bow, a stern, and sides and being supported above a surface by an air cushion, a skirt system for supporting and containing the air cushion as described in claim 1 wherein the side seals comprise a series of flexible sleeves fixed to and depending downward from the inflated bag at the sides of the hull, each of said sleeves having an inward facing wall, an outward facing wall, and side walls, said walls cooperating to form an interior cell communicating with the flexible bag to receive pressurized fluid therefrom to cause said sleeve to inflate, said cell having an opening at its lower end, said opening being in a plane extending at an upward inclined angle from the plane of the supporting surface toward the air cushion thereby exposing said opening to the air cushion, the inward facing wall of said sleeve facing the air cushion being vertical or slanted inward, from top to bottom, at an angle to the vertical.

3. In an amphibious vehicle having a hull consisting of a bow, a stern, and sides and being supported above a surface by an air cushion, a skirt system for supporting and containing the air cushion as described in claim 1 wherein the stern seal comprises a series of flexible sleeves fixed to and depending downward at the stern of the hull, each of said sleeves having a rearward facing wall and a forward facing wall and side walls, said walls forming an interior cell communicating with the flexible bag to receive pressurized fluid therefrom to cause said sleeve to inflate, said stern seal sleeve having an elongated forward facing surface forming a bottom wall said wall extending forward, from said rear facing wall to said forward facing wall, at an upward inclined angle from the plane of the supporting surface toward the air cushion, said rear facing wall being slanted rearward from top to bottom at an angle to the vertical, and said stern seal cell having a discharge port constructed at the juncture of the bottom wall with the rearward facing wall.

4. In an amphibious vehicle having a hull consisting of a bow, a stern, and sides and being supported above a surface by an air cushion, a skirt system for supporting and containing the air cushion as described in claim 1 wherein the side seals are fixed to the bag at a position such that the area of the air cushion is maximized.

5. In an amphibious vehicle having a hull consisting of a bow, a stern, and sides and being supported above a surface by an air cushion, a skirt system for supporting and containing the air cushion as described in claim 4 wherein the sideseals are fixed to the bag at a position such that the area of the air cushion is maximized, said position being at least to the extent that the outer periphery of the air cushion is vertically aligned with the outer edge of the hull.

6. In an amphibious vehicle having a hull consisting of a bow, a stern, and sides and being supported above a surface by an air cushion, a skirt system for supporting and containing the air cushion as described in claim 1 wherein the angles to the vertical of the rearward facing wall of the bow seal and the inward facing wall of the side seal are in the range of between 0 to 15 degrees from top to bottom.

7. In an amphibious vehicle having a hull consisting of a bow, a stern, and sides and being supported above a surface by an air cushion, a skirt system for supporting and containing the air cushion comprising:

a flexible bag, inflated by a pressurized fluid, surrounding the periphery of the bottom of the hull and extending downward therefrom;

a seal system depending downward from the inflated bag, said seal system comprising a bow seal, a stern seal and a pair of side seals, wherein:

the bow seal comprises a series of flexible sleeves fixed to and depending downward from the inflated bag at the bow of the hull, each of said sleeves having a rearward facing wall, a forward facing wall, and side walls, said walls cooperating to form an interior cell communicating with the flexible bag to receive pressurized fluid therefrom to cause said sleeve to inflate, said cell having an opening at its lower end, said opening being in a plane extending at an upward inclined angle from the plane of the supporting surface toward the air cushion thereby exposing said opening to the air cushion, the rearward facing wall of said sleeve facing the air cushion being slanted rearward from top to bottom at an angle to the vertical;

the side seals comprise a series of flexible sleeves fixed to and depending downward from the inflated bag at the sides of the hull, each of said sleeves having an inward facing wall, an outward facing wall, and side walls, said walls cooperating to form an interior cell communicating with the flexible bag to receive pressurized fluid therefrom to cause said sleeve to inflate, said cell having an opening at its lower end, said opening being in a plane extending at an upward inclined angle from the plane of the supporting surface toward the air cushion thereby exposing said opening to the air cushion, the inward facing wall of said sleeve facing the air cushion being vertical or slanted inward from top to bottom at an angle to the vertical;

the stern seal comprises a series of flexible sleeves fixed to and depending downward at the stern of the hull, each of said sleeves having a rearward facing wall and a forward facing wall and side walls, said walls forming an interior cell communicating with the flexible bag to receive pressurized fluid therefrom to cause said sleeve to inflate, said stern seal sleeve having an elongated forward facing surface forming a bottom wall said wall extending forward, from said rear facing wall to said forward facing wall, at an upward inclined angle from the plane of the supporting surface toward the air cushion, said rear facing wall being slanted rearward from top to bottom at an angle to the vertical, and said stern seal cell having a discharge port constructed at the juncture of the bottom wall with the rearward facing wall; and the side seals are fixed to the bag at a position such that the area of the air cushion is maximized, said position being at least to the extent that the outer periphery of the air cushion is vertically aligned with the outer edge of the hull.

* * * * *